United States Patent
Ivler et al.

[11] Patent Number: 6,157,923
[45] Date of Patent: Dec. 5, 2000

[54] QUERY PROCESSING BASED ON ASSOCIATED INDUSTRY CODES

[75] Inventors: J. M. Ivler, Los Alamitos; Frank Rubin, Pacific Palisades, both of Calif.

[73] Assignee: Ensera, Inc., San Francisco, Calif.

[21] Appl. No.: 09/084,810

[22] Filed: May 26, 1998

[51] Int. Cl.[7] ................................................ G06F 17/30
[52] U.S. Cl. ................................ 707/3; 707/4; 707/10
[58] Field of Search ........................... 707/3, 1, 4, 10, 707/524; 395/600, 161

[56] References Cited

U.S. PATENT DOCUMENTS

| | | | |
|---|---|---|---|
| 4,789,928 | 12/1988 | Fujisaki | 364/401 |
| 4,799,156 | 1/1989 | Shavit et al. | 364/401 |
| 5,179,652 | 1/1993 | Rozmanith et al. | 395/155 |
| 5,193,185 | 3/1993 | Lanter | 395/600 |
| 5,201,046 | 4/1993 | Goldberg et al. | 395/600 |
| 5,243,515 | 9/1993 | Lee | 364/401 |
| 5,287,448 | 2/1994 | Nicol et al. | 395/159 |
| 5,384,894 | 1/1995 | Vassiliadis et al. | 395/61 |
| 5,444,823 | 8/1995 | Nguyen | 395/51 |
| 5,544,352 | 8/1996 | Egger | 395/600 |
| 5,560,007 | 9/1996 | Thai | 395/600 |
| 5,594,837 | 1/1997 | Noyes | 395/63 |
| 5,606,602 | 2/1997 | Johnson et al. | 379/115 |
| 5,621,201 | 4/1997 | Langhans et al. | 235/380 |
| 5,640,569 | 6/1997 | Miller et al. | 395/729 |
| 5,701,399 | 12/1997 | Lee et al. | 395/51 |
| 5,913,210 | 7/1999 | Call | 707/3 |
| 5,991,735 | 11/1999 | Gerace | 705/10 |
| 5,991,750 | 11/1999 | Watson | 705/44 |
| 5,999,908 | 12/1999 | Abelow | 705/1 |
| 6,002,850 | 12/1999 | Sumino et al. | 395/161 |
| 6,003,040 | 12/1999 | Mital et al. | 707/101 |

*Primary Examiner*—Jean R. Homere
*Attorney, Agent, or Firm*—Ryan & Mason, L.L.P.

[57] ABSTRACT

A user query is processed to determine a first industry code corresponding to information requested in the query. One or more stored non-keyword-based associations are then used to determine at least one additional industry code which is not a subset or superset of the first industry code. The first and additional industry codes may be in different industry code hierarchies, or in otherwise unrelated portions of the same hierarchy. Information corresponding to the first and additional industry codes is then displayed to the user in response to the query. The display of information for particular industry codes may be based at least in part on a set of weights which indicate relative importance of the corresponding stored associations to users of the system. The weights may be established and maintained by monitoring actual user selections made from previous displays. The displayed information may include a list of companies or other sources for one or more of the industry codes, and a feature may be provided which permits the sources to bid for a particular position in the list.

20 Claims, 5 Drawing Sheets

FIG. 1 PRIOR ART

3700: Transportation Equipment Manufacturers 12-1 {
- 3711: Motor Vehicle and Passenger Car Bodies
  - 3711-01: Recreational Vehicles and Campers
  - 3711-02: Automobile Manufacturers
  - 3711-03: Automobile Body Manufacturers
  - 3711-04: Electric Cars-Automobile
  - 3711-05: Ambulances and Hearses Manufacturers
  - 3711-06: Armored Car
  - 3711-07: Fire Trucks
  - 3711-08: Buses
  - 3711-09: Trucks
  - 3711-10: Towing Equipment 12-2 {
- 3713 Trucks and Buses
  - 3713-01: Bus Bodies
  - 3713-02: Automobile Wreckers
  - 3713-03: Truck Bodies
  - 3713-04: Truck Sleepers 3714 Motor Vehicle Parts
·
·
·

3721 Aircraft Manufacturers
·
·
·

3731 Ship Building
·
·
·

3761 Guided Missiles and Space Vehicles
·
·
·

FIG. 5

QUERY PROCESSING BASED ON ASSOCIATED INDUSTRY CODES

FIELD OF THE INVENTION

The present invention relates generally to systems for use in processing user queries in electronic commerce and other applications, and more particularly to computer software which processes user queries utilizing stored associations between industry codes.

BACKGROUND OF THE INVENTION

Figure 1:
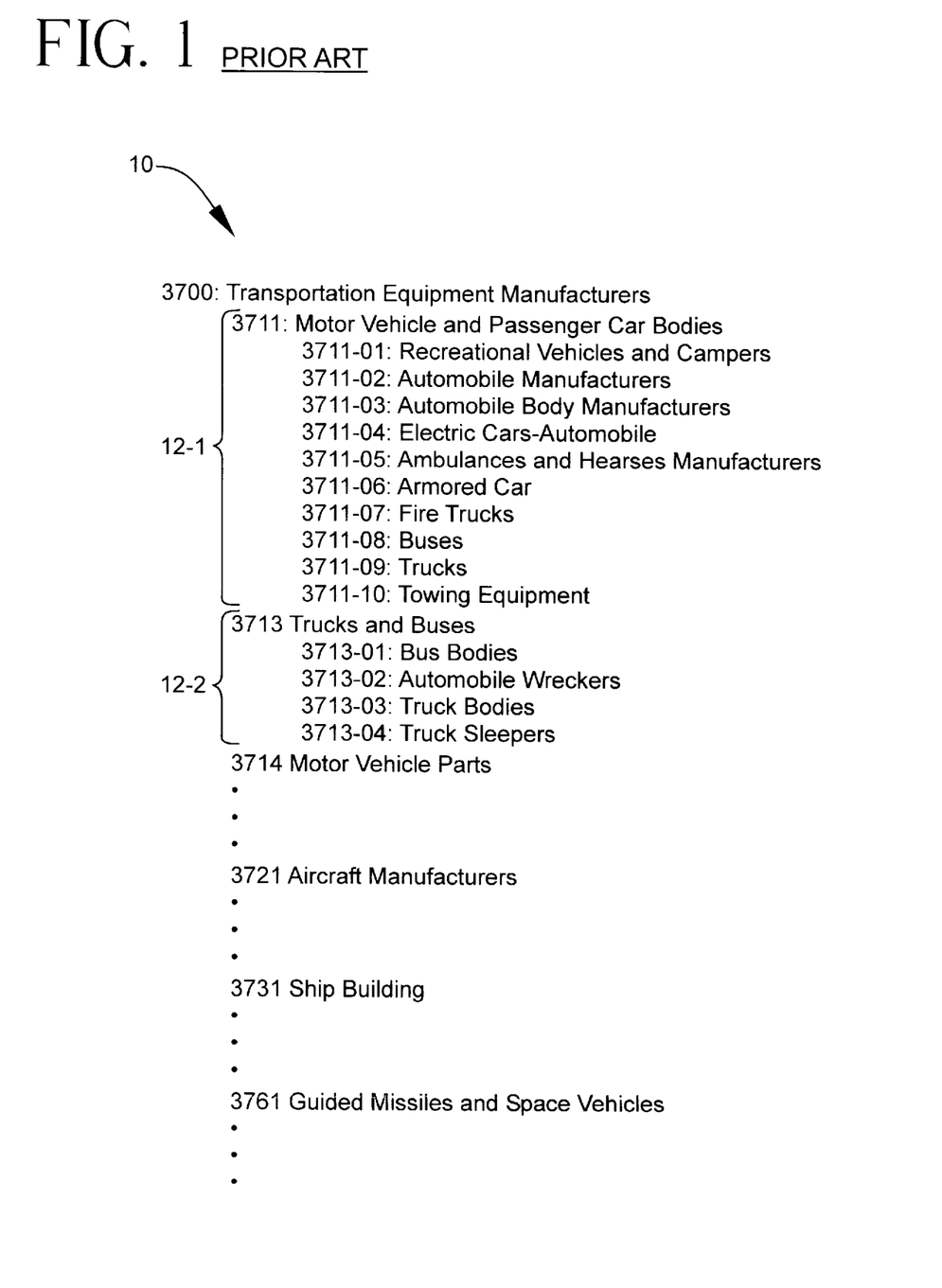
FIG. 1 shows a portion of a conventional industry code hierarchy.

Conventional query processing systems often make use of Standard Industrial Classification (SIC) codes or other similar codes which identify categories of products and services. For example, such a system may process a user request for information on a particular product or service in order to determine the corresponding SIC code, and then use the SIC code to retrieve and display the appropriate information to the user. SIC codes are organized around families of relationships in the form of a parent-child hierarchy. The relationships between items in different levels of the hierarchy are generally in terms of supersets and subsets. FIG. 1 illustrates a conventional SIC parent-child hierarchy 10 which includes SIC code 3711-02 for Automobile Manufacturers. The hierarchy 10 includes SIC code 3700 for Transportation Equipment Manufacturers, and a number of subsets of SIC code 3700, including a subset 12-1 corresponding to SIC code 3711 for Motor Vehicle and Passenger Card Bodies, a subset 12-2 corresponding to SIC code 3713 for Trucks and Buses, as well as other subsets. Although the hierarchy 10 of FIG. 1 can provide a great deal of information regarding different types of manufacturers, including automobile manufacturers, it does not provide information on other products or services which are not within the hierarchy.

A known technique for expanding the amount of relevant information provided in response to a given user query makes use of keyword relationships between SIC code entries in different hierarchies. This technique may utilize a keyword search across multiple hierarchies in order to provide the user with additional relevant information. For example, a user query regarding automobile manufacturers may be processed to extract the keyword "automobile." Any SIC code entry having that keyword or a sufficiently similar version thereof in its descriptor may then be retrieved and displayed to the user, in addition to the entry for automobile manufacturers. These keyword-related SIC codes may include, for example, SIC code 5500 for Auto Dealers and Service Stations, SIC codes 6141-03 and 6141-04 for Loans and Financing Automotive, and SIC code 6411-11 for Insurance Automotive. Although this keyword-based technique provides an improvement over simply retrieving a single SIC hierarchy, it fails in many situations to provide the user with the most relevant and complete information. For example, there may be many categories of goods and services related to an SIC code obtained from a user query which the keyword-based technique will fail to retrieve. This inability to provide the user with information from otherwise unrelated multiple hierarchies is a significant drawback of conventional query processing systems.

SUMMARY OF THE INVENTION

The present invention provides methods and apparatus for processing user queries utilizing stored associations between industry codes. The associations, which are referred to herein as "cousins" associations, may be viewed as non-keyword-based relationships established between an industry code in a given hierarchy and other industry codes in other hierarchies or otherwise unrelated portions of the same hierarchy. The cousins associations are based on information which indicates that a user interested in one industry code will be likely to be interested in one or more other codes despite the lack of a keyword association between the descriptors for these codes. The cousins associations may be established a priori based on known user query habits, or as part of an on-going "learning" process based on actual interactions between the users and the system, or using a combination of these and other techniques.

In an illustrative embodiment of the invention, a user query is processed to determine a first industry code corresponding to information requested in the query. One or more stored cousins associations are then used to determine at least one additional industry code which is not a subset or superset of the first industry code. As noted above, the first and additional industry codes may be in different industry code hierarchies, or in otherwise unrelated portions of the same hierarchy. Information corresponding to the first and additional industry codes is then displayed to the user in response to the query. The display of information for particular industry codes may be based at least in part on a set of stored weights which indicate relative importance of the corresponding stored associations to users of the system. The weights may be established and maintained by monitoring actual user selections made from previous displays. The displayed information may include a list of companies or other sources for one or more of the industry codes, and a feature may be provided which permits the sources to bid for a particular position in the list.

The invention provides a consumer-centric approach to industry code-based processing of user queries, and exhibits substantially improved performance relative to conventional systems based solely on parent-child or keyword associations. A query processing system in accordance with the invention can be implemented in software, hardware, and various combinations thereof. For example, the invention may be implemented in software such as web browsers, search engines and other types of query-processing programs, and hardware embodiments such as various arrangements of clients, servers, processors, memory, databases and other network elements.

DETAILED DESCRIPTION OF THE INVENTION

The invention will be illustrated below in conjunction with an exemplary system for processing user queries.

Although particularly well-suited for use in electronic commerce applications utilizing the Internet or other computer networks, the invention is not limited to use with any particular type of application, network or network communication protocol. The term "hierarchy" as used herein refers to an arrangement of elements into two or more levels such that groups of elements in the different levels are related as subsets or supersets. The term "query" as used herein is intended to include any type of request that may be generated by a user. Examples of user queries which may be processed using the invention include plain-text queries manually entered by a user in a display generated by a browser, search engine, graphical user interface or other application program, voice-based queries entered by a user equipped with speech recognition software, client requests generated in accordance with the Hypertext Transfer Protocol (HTTP), as well as combinations of these and other types of requests. The term "industry code" as used herein is intended to include Standard Industrial Classification (SIC) codes as well as any other type of codes or identifiers which may be used to specify categories of goods or services.

Figure 2A:
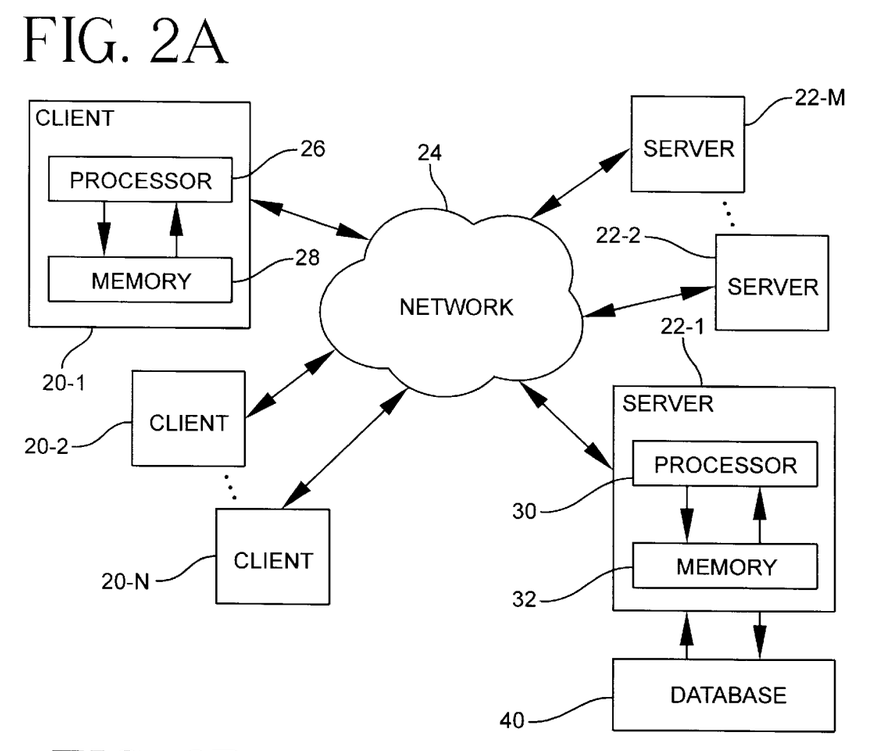
FIG. 2A is a block diagram of a query processing system configured in accordance with one possible embodiment of the invention.

FIG. 2A shows an exemplary system in which the query processing of the invention may be implemented. The system includes a number of clients 20-1, 20-2, ... 20-N which communicate with a number of servers 22-1, 22-2, ... 22-M over a network 24. The clients 20-i and servers 22-i may be computers associated with the system. The network 24 may be a global computer network such as the Internet, a local area network, a wide area network, an intranet or extranet, a telephone, cable or satellite network, or other type of network as well as combinations of these and other networks. A client may establish a connection with a server in the system using a uniform resource locator (URL) which includes a domain name identifying the server. The processing of a query may involve multiple communications between a client and a server. For example, a user query for information on a particular subject may result in the server retrieving SIC data which is processed and displayed to the user associated with the client. The user is then permitted to select one or more of the displayed items for which the user would like to receive further information. The server processes the selection and delivers the appropriate information to the client for display to the user. The server may also request additional refinement of the user query, such as a user-entered zip code, city, state or other locale information. The server can then limit the responses it provides based on locale as determined from the user-entered information.

The client 20-1 in this embodiment includes a processor 26 coupled to a memory 28, and the server 22-1 includes a processor 30 coupled to a memory 32. The other clients and servers in the system of FIG. 2A may be configured in a similar manner. The processors 26, 30 may represent, for example, microprocessors, central processing units (CPUs), application specific integrated circuits (ASICs) or other types of digital data processors in a computer or other device. Alternatively, the processors 26, 30 may represent computers or groups of computers. The memories 38 and 42 may represent electronic memory, optical or magnetic disk-based memory, as well as combinations of these and other types of memory.

Figure 2B:
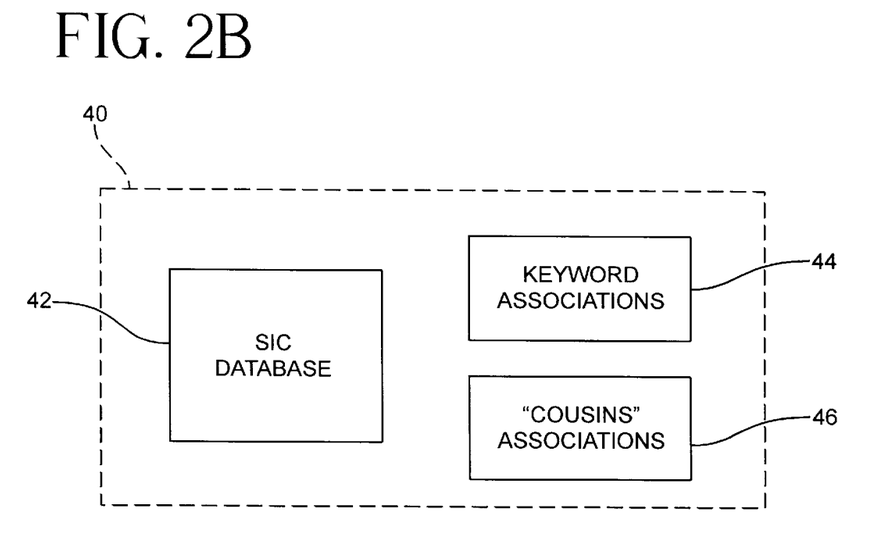
FIG. 2B shows a more detailed view of a database in the system of FIG. 2A.

The server 22-1 in this embodiment is coupled to a database 40. As will be described below, the database 40 contains information which is used by the server 22-1 in processing a query received from one of the clients 20-i. The other servers 22-i in the system of FIG. 2A may also be coupled to the database 40 or to another database. FIG. 2B shows one possible embodiment of the database 40 in greater detail. In this example, database 40 includes an SIC database 42, a set of stored keyword associations 44, and a set of stored non-keyword-based associations 46 which are referred to herein as "cousins" associations. The SIC database 42 includes a number of stored SIC hierarchies including SIC code entries and their corresponding descriptors. The keyword associations 44 represent keyword-based relationships between SIC code entries in one hierarchy and SIC code entries in other hierarchies, as previously described. The cousins associations 46, which will be described in greater detail in conjunction with FIG. 3 below, represent non-keyword-based relationships between, e.g., SIC code entries in one hierarchy and SIC code entries in other hierarchies. The term "cousins" is used in part to distinguish these associations from parent-child associations used in conventional SIC code-based processing. The cousins associations provide additional relationships between SIC code entries beyond the parent-child and keyword-based relationships associated with conventional systems. This allows more relevant and complete SIC code information to be retrieved and displayed in response to a user query. Although shown as components of a single database 40 in this example, the SIC database 42, keyword associations 44 and cousins associations 46 may be configured as separate databases using separate storage devices, or each may be distributed across multiple storage devices.

Figure 3:
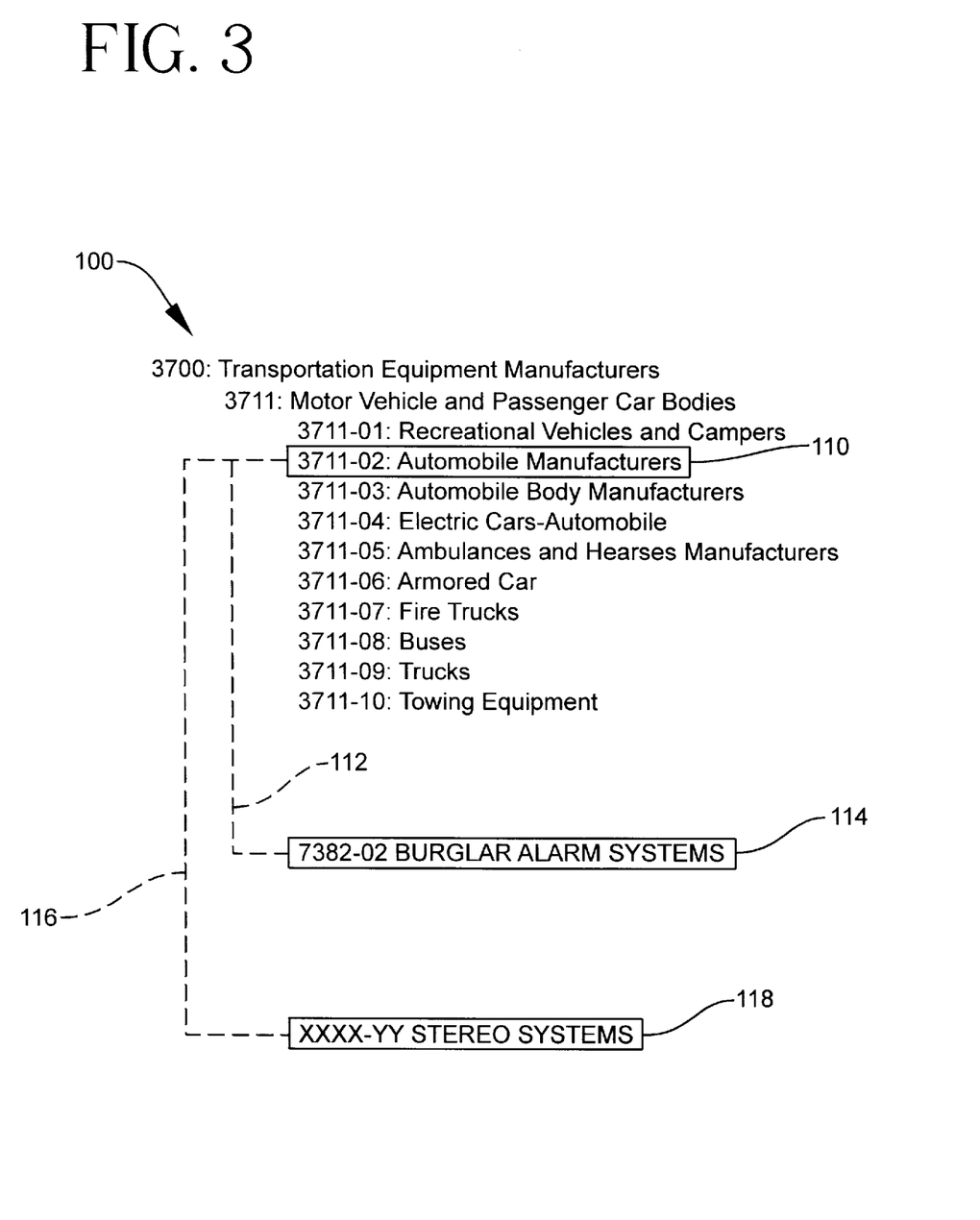
FIG. 3 illustrates cross-hierarchical associations between industry codes that may be utilized to process a user query in the system of FIG. 2A.

FIG. 3 illustrates an example of cousins associations in accordance with the invention. A portion of an SIC hierarchy 100 is shown. The hierarchy 100 corresponds generally to SIC code 3700 for Transportation Equipment Manufacturers and includes an entry 110 corresponding to SIC code 3711-02 for Automobile Manufacturers. The SIC hierarchy 100 including the SIC code entries and their descriptors may be stored in the SIC database 42 of FIG. 2B. The dashed lines in FIG. 3 represent cousins associations established between the SIC code entry 110 and other SIC code entries in other hierarchies. As previously noted, these cousins associations are not based on keyword associations between the SIC code descriptors. The cousins associations are instead based on other information which indicates that a user interested in one SIC code will be likely to be interested in one or more other SIC codes despite the lack of a keyword association between these SIC codes.

As shown in FIG. 3, a cousins association 112 is established between SIC code entry 110 for Automobile Manufacturers and an SIC code entry 114 for Burglar Alarm Systems. These SIC code entries are in different hierarchies and do not share any common keyword, and yet may well be of interest to a user looking for a variety of information regarding automobile-related products and services. Similarly, a cousins association 116 is established between SIC code entry 110 and an SIC code entry 118 for Stereo Systems. Again, although these SIC code entries are in different hierarchies and do not share any common keyword, the entries are likely to be of interest to a user looking for information regarding automobile-related products and services. The cousins associations 112 and 116 are stored in the cousins associations portion of the database 40 and are used in conjunction with the keyword associations to retrieve and display relevant SIC data in response to a user query.

It should be apparent that a wide variety of other types of cousins associations may be established in accordance with the invention. As another example, consider a user query directed to "automobile collision repair." Conventional SIC code-based processing of this query might yield SIC code entries such as Auto Body Repair (7532-01), Auto Painting (7532-02), and Auto Parts (5531-11). Cousins associations established in the manner described above can be used to yield additional relevant SIC code entries, such as Attorneys (8111-03), Medical Doctors (8011-01) and Chiropractors (8041-01).

Figure 4:
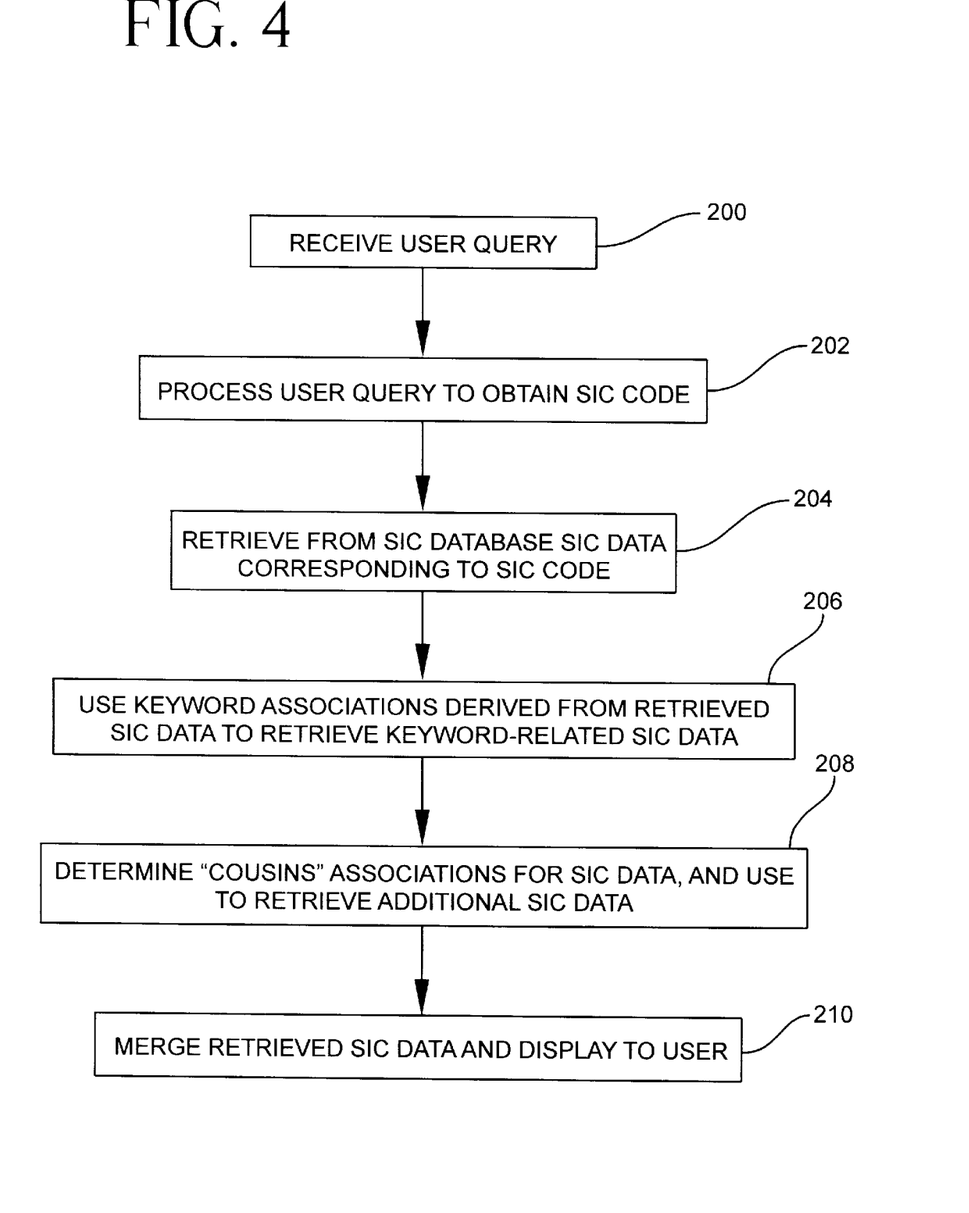
FIG. 4 is a flow diagram illustrating user query processing in accordance with the invention.

FIG. 4 is a flow diagram illustrating user query processing in accordance with the invention. In step 200, a user query is received. As previously noted, the user query may be a plain-text query entered by the user in a display by generated by a browser, search engine, graphical user interface or other application program. It will be assumed for this example that the user query is a plain-text query. In step 202, the plain-text query is processed to obtain a corresponding SIC code. This step may make use of a parser which parses the user query to identify one or more words or phrases that correspond to SIC codes. A resulting SIC code is used in step 204 to retrieve the corresponding SIC data from the SIC database 42. The retrieved SIC data is then used to determine keywords in step 206. These keywords are used in conjunction with the stored keyword associations 44 to retrieve keyword-related SIC data from the SIC database 42. In step 208, the stored cousins associations 46 for the previously-retrieved original and keyword-related SIC data are used to retrieve additional SIC data related to the user query.

In step 210, the SIC data retrieved in steps 204, 206 and 208 is merged and presented to the user. For example, the user may be provided with a graphical display in which the received SIC codes and their corresponding descriptors are arranged in an ordered list. Each of the items in the list may be followed by a parenthetical which includes the number of subitems for that item, and a button, icon, link or other indicator which the user can select by, e.g., pointing and clicking a mouse or similar device, in order to obtain additional information regarding that item.

When a user selects a given item in a displayed list of SIC codes, a list of sources of the corresponding product or service may be displayed. In accordance with the invention, this display may be generated in a manner which provides priority within the list to a particular source or sources of the products or services. For example, a software program in accordance with the invention may include a bidding engine which allows sources of goods and services to bid for their positions in the list displayed to the user. The bidding engine may be accessed by the sources over a network in a conventional manner, and provides an interface for the sources to enter their bids for the various available display positions. The bidding engine is operative to receive and process the bids, and to determine based on the bids which sources will occupy which positions in the list of sources displayed to the user. For example, the bidding engine may establish and maintain a bidding database of companies which have submitted winning bids for the top ten positions in a given list. During an established bidding cycle, all bids may be visible to all the potential bidders. The bidding cycle is closed at a specified time, all bids are then made final, and the corresponding position information is stored in the bidding database. The bidding system may be protected by assigning accounts to sources authorized to participate in the bidding process. Numerous alternative implementations of the bidding arrangement are of course possible. This aspect of the invention provides an additional source of revenue to the query processing service operator, as well as an indication to the user as to which sources have demonstrated the greatest interest in obtaining business through the service.

The cousins associations 46 may be established a priori based on known user query habits, or as part of an on-going "learning" process based on actual interactions between one or more users and the system, or using a combination of these and other techniques. For example, if a sufficient number of users when utilizing the system enter a query for "stereos" in conjunction with a query for "automobiles," the cousin association 116 between SIC code entries 110 and 118 may be established and stored in the database 40. This association is then used to automatically present both SIC code entries in response to a subsequent user query regarding "automobiles." Weights may be maintained for the different cousins associations that are established, such that over time the system can determine whether the association is actually of value to the users. The value of the association will be evident based on whether or not users make a selection from the associated SIC code when it is displayed to them. Its weight is thus adjusted to reflect its usage, and the system may be configured to present only the most useful associations to the user, while deleting associations which have been demonstrated to be of lesser utility. In this manner the invention provides dynamic maintenance of the cousins associations so as to ensure that the most relevant information is presented to the user. The stored weights may also be used to exclude from display any portion of an SIC hierarchy or set of SIC code entries which has, e.g., a lower than average weighting or a weighting below a minimum threshold required for the particular area of interest. The weights and other related information may be stored with the corresponding cousins associations in the database 40.

Figure 5:
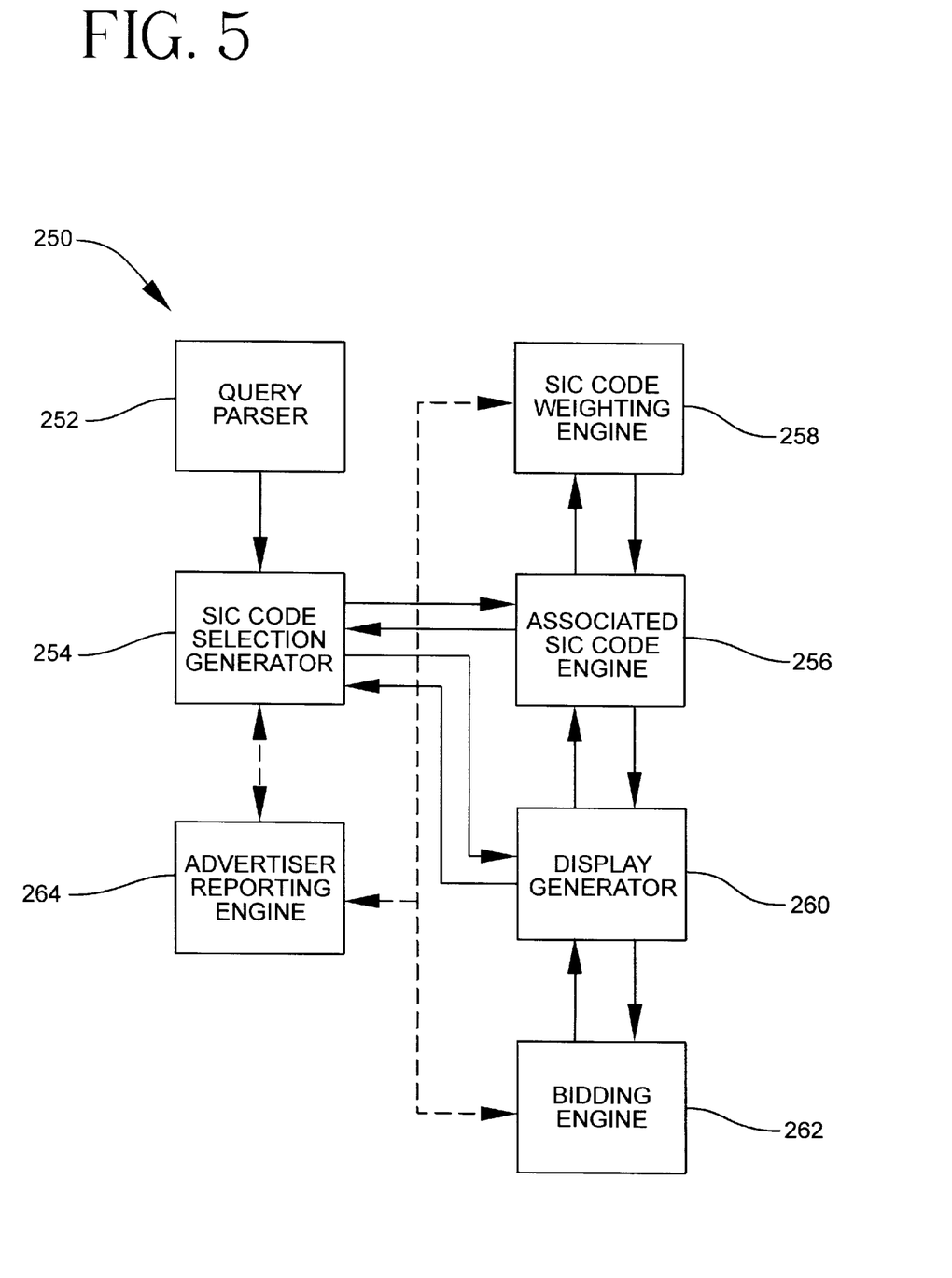
FIG. 5 is a block diagram illustrating the operation of a software program configured in accordance with the invention.

FIG. 5 is a block diagram illustrating the elements of an exemplary software program 250 configured in accordance with the invention. The program 250 includes a query parser 252 which parses a user query to generate at least one corresponding SIC code as previously described. The query parser 252 may make use of rules, pattern matching, syntactical analysis and other known techniques to process the user query. The resulting SIC code is supplied to an SIC code selection generator 254. The selection generator 254 retrieves corresponding SIC data from the SIC database, and operates in conjunction with an associated SIC code engine 256 to retrieve additional SIC data using the keyword associations 44 and cousins associations 46 previously described. The associated SIC code engine 256 controls the establishment of the cousins associations in the manner previously described. An SIC code weighting engine 258 maintains the above-noted weights which are used to determine the effectiveness of particular cousins associations as reflected by actual user selections.

A display generator 260 processes the retrieved SIC data for presentation to the user, making use of the weights maintained by the weighting engine 258. The display generator 260 may thus configure the display such that the associated SIC codes with the highest weights, and thus the greatest likelihood of being of interest to the user, are more prominently displayed. The display generator 260 also interacts with a bidding engine 262 that, as noted above, allows sources of goods and services to bid for positions in a list displayed to the user. An advertiser reporting engine 264 gathers information from elements 254, 258 and 262 in order to determine the effectiveness of the system for a particular source. For example, the advertiser reporting engine 264 may permit companies or other sources that have participated in the bidding process to see statistics for the delivery of information for the SIC code in which they have bid for a position. These statistics may include the number of times the SIC code was provided as a selection to users, and the number of times that the SIC code was actually downloaded to users. It should be noted that a software program in accordance with the invention need not include all of the elements shown in FIG. 5, and may include many alternative configurations of these and other elements. Moreover, the various elements of a software program in accordance with the invention may be distributed between a client and a server or servers. For example, the query parser 252 and display generator 260 may be running on a client, while the other elements are running on one or more servers.

The above-described embodiments of the invention are intended to be illustrative only. Alternative embodiments may utilize other types of non-keyword-based associations between industry codes. For example, a possible alternative embodiment of the invention may establish an association between one industry code in a particular hierarchy and another industry code which, although it may be somewhere in the same hierarchy, would not have been associated with the other code in a conventional processing system. As previously noted, a query processing system in accordance with the invention can be implemented in software, hardware, and various combinations thereof. The invention may be embodied in software such as web browsers, search engines and other types of query-processing programs, and in hardware such as various arrangements of clients, servers, processors, memory, databases and other network elements. The software embodiments of the invention may be in the form of a computer readable medium such as a magnetic or optical disk. These and numerous other alternative embodiments within the scope of the following claims will be apparent to those skilled in the art.

What is claimed is:

1. A method of processing a user query in a computer system, the method comprising the steps of:
   determining a first industry code based on the query; and
   displaying to the user information corresponding to the first industry code, in conjunction with information corresponding to at least one additional industry code which is not a subset or superset of the first industry code, does not share a common keyword with the first industry code and is not specified by the query, wherein the first and additional industry codes are related by a non-keyword-based association which is determined at least in part based on a result of processing a previous query and stored in the computer system.

2. The method of claim 1 wherein the first and additional industry codes are located in different industry code hierarchies.

3. The method of claim 1 wherein the first and additional industry codes are located in different portions of the same industry code hierarchy.

4. The method of claim 1 further including the steps of:
   storing a plurality of non-keyword-based associations;
   maintaining a set of weights indicating relative importance of the associations to users of the system, wherein the weights are determined by monitoring user selections; and
   displaying information to the user such that display of information corresponding to a particular industry code is determined at least in part based on one or more of the weights.

5. The method of claim 1 further including the step of displaying a plurality of sources for at least one of the first and the additional industry codes.

6. The method of claim 5 further including the step of establishing a position of a given one of the sources in a list of the sources displayed to the user based on results of bids received from the sources.

7. The method of claim 1 wherein the processing and displaying steps are implemented in at least one software program running on at least one computer in the computer system.

8. The method of claim 1 wherein the association between the first and additional industry codes is established based on information obtained from previous user queries.

9. The method of claim 1 wherein the association is stored in a database associated with a server which processes the user query.

10. An apparatus for processing a user query in a computer system, the apparatus comprising:
    a processor for processing a first industry code determined based on the query; and
    a memory coupled to the processor for storing a non-keyword-based association between the first industry code and at least one additional industry code which is not a subset or superset of the first industry code, wherein the second industry code does not share a common keyword with the first industry code and is not specified by the query the non-keyword-based association being determined at least in part based on a result of processing a previous query, and wherein information corresponding to the first industry code is displayed to the user in conjunction with information corresponding to the additional industry code.

11. The apparatus of claim 10 wherein the first and additional industry codes are located in different industry code hierarchies.

12. The apparatus of claim 10 wherein the first and additional industry codes are located in different portions of the same industry code hierarchy.

13. The apparatus of claim 10 wherein the processor is further operative to store a plurality of non-keyword-based associations, to maintain a set of weights indicating relative importance of the associations to users of the system, wherein the weights are determined by monitoring user selections, and to display information to the user such that display of information corresponding to a particular industry code is determined at least in part based on one or more of the weights.

14. The apparatus of claim 10 wherein the processor is further operative to establish a position of a given one of a plurality of sources in a list of sources displayed to the user based on results of bids received from the sources.

15. The apparatus of claim 10 wherein the processor is associated with a server which communicates with a client at which the user query is generated.

16. The apparatus of claim 10 wherein the memory is associated with a server which communicates with a client at which the user query is generated.

17. The apparatus of claim 10 wherein the processor is further operative to establish the association between the first and additional industry codes based on information obtained from previous user queries.

18. An article of manufacture comprising a computer readable medium having computer readable code means embodied thereon, said computer readable code means comprising:
    a step to determine a first industry code based on the query; and
    a step to display to the user information corresponding to the first industry code, in conjunction with information corresponding to at least one additional industry code which is not a subset or superset of the first industry code, does not share a common keyword with the first industry code and is not specified by the query, wherein the first and additional industry codes are related by a non-keyword-based stored association which is determined at least in part based on a result of processing a previous query.

19. A method of processing a user query in a computer system, the method comprising the steps of:
- determining a first industry code based on the query, wherein the first industry code is in a first hierarchy; and
- displaying to the user information corresponding to the first industry code, in conjunction with information corresponding to at least one additional industry code, wherein the additional industry code is in a separate hierarchy distinct from the first hierarchy, does not share a common keyword with the first industry code and is not specified by the query, and the first and additional industry codes are related by a non-keyword-based stored association which is determined at least in part based on a result of processing a previous query.

20. A method of processing a user query in a computer system, the method comprising the steps of:
- processing the user query to obtain first and second industry codes, wherein the first and second industry codes are related by a non-keyword-based association and are located in different parent-child hierarchies, and wherein the second industry code does not share a common keyword with the first industry code and is not specified by the user query the non-keyword-based association being determined at least in part based on a result of processing a previous query; and
- displaying to the user which generated the user query information corresponding to the first and second industry codes.

* * * * *